(12) United States Patent
Ogawa

(10) Patent No.: US 12,731,368 B2
(45) Date of Patent: Sep. 8, 2026

(54) DEVICE FOR ORTHOGONAL DISCRIMINATION OF TABLETS ALIGNED IN A LINEAR ARRANGEMENT

(71) Applicant: NEC Corporation, Tokyo (JP)

(72) Inventor: Takuya Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 319 days.

(21) Appl. No.: 18/569,697

(22) PCT Filed: Jun. 17, 2021

(86) PCT No.: PCT/JP2021/023101
§ 371 (c)(1),
(2) Date: Dec. 13, 2023

(87) PCT Pub. No.: WO2022/264382
PCT Pub. Date: Dec. 22, 2022

(65) Prior Publication Data

US 2024/0290066 A1 Aug. 29, 2024

(51) Int. Cl.
*G06V 10/44* (2022.01)
*G06T 7/00* (2017.01)
(Continued)

(52) U.S. Cl.
CPC ............ *G06V 10/44* (2022.01); *G06T 7/0002* (2013.01); *G06V 10/28* (2022.01); *G06V 10/34* (2022.01);
(Continued)

(58) Field of Classification Search
None
See application file for complete search history.

(56) References Cited

U.S. PATENT DOCUMENTS 6,535,637 B1 * 3/2003 Wootton ................ B65B 57/00 221/102
2010/0096299 A1 * 4/2010 Adams .................... B07C 5/342 209/577

FOREIGN PATENT DOCUMENTS

JP H03-65640 A 3/1991
JP H07-16106 U 3/1995
(Continued)

OTHER PUBLICATIONS

International Search Report for PCT Application No. PCT/JP2021/023101, mailed on Sep. 7, 2021.

*Primary Examiner* — S J Park
*Assistant Examiner* — Caroline E. Depalma
(74) *Attorney, Agent, or Firm* — Sughrue Mion, PLLC

(57) ABSTRACT

An object discrimination device includes an acquisition unit, a binarization unit, a feature extraction unit, and an area computation unit. The acquisition unit acquires an image of an imaging area where objects are aligned in an array from a direction orthogonal to the object alignment direction. The binarization unit generates, from the image, a binarized image of an object area that is an area where the object is present. The feature extraction unit computes a total pixel value for each array of pixel values aligned in a direction orthogonal to the object alignment direction in the binarized image, and generates a total pixel value array in which the total pixel values for the respective arrays are aligned in the object alignment direction. The area computation unit computes an object boundary in the alignment direction of the objects in the binarized image on the basis of the total pixel value array.

14 Claims, 16 Drawing Sheets

(51) Int. Cl.
*G06V 10/28* (2022.01)
*G06V 10/34* (2022.01)
*G06V 20/60* (2022.01)

(52) U.S. Cl.
CPC .... *G06V 20/60* (2022.01); *G06T 2207/30108* (2013.01)

(56) References Cited

FOREIGN PATENT DOCUMENTS

| | | | | |
|---|---|---|---|---|
| JP | H0915159 | A | * | 1/1997 |
| JP | H0953916 | A | * | 2/1997 |
| JP | 2012-012131 | A | | 1/2012 |
| JP | 2012-242289 | A | | 12/2012 |
| JP | 2015-529154 | A | | 10/2015 |

* cited by examiner

DEVICE FOR ORTHOGONAL DISCRIMINATION OF TABLETS ALIGNED IN A LINEAR ARRANGEMENT

This application is a National Stage Entry of PCT/JP2021/023101 filed on Jun. 17, 2021, the contents of all of which are incorporated herein by reference, in their entirety.

TECHNICAL FIELD

The present invention relates to an object discrimination device, an object discrimination method, and a storage medium.

BACKGROUND ART

A system for appearance inspection based on an image in which objects such as tablets or confectionary are captured with a camera may adopt a configuration of guiding the inspection objects, in an aligned state, to an inspection device one by one for total inspection (for example, see Patent Literature 1). In such an inspection system, it is necessary to compute an object boundary in the object alignment direction from an image obtained by capturing an imaging area where a plurality of objects are aligned while being in contact with each other.

As a technique of computing an object boundary in the object alignment direction from an image obtained by capturing an imaging area where a plurality of objects are aligned while being in contact with each other, the art described in Patent Literature 2 (hereinafter referred to as related art) has been known.

In the related art, first, an inspected body in which a plurality of objects (biscuits or the like in Patent Literature 2) are vertically arranged and aligned in a container is irradiated with an X ray from a direction orthogonal to the alignment direction of the objects, and an X-ray transmission image is acquired. Then, in the related art, from the acquired X-ray transmission image, a binarized image of an area corresponding to the objects is extracted. Then, in the related art, from the extracted binarized image of the object area, protruding areas of the objects in a direction orthogonal to the object alignment direction and orthogonal to the X-ray irradiation direction are extracted. Specifically, in the related art, the binarized image is reduced in size in a direction orthogonal to the object alignment direction, and a difference image between the reduced image and the original binarized image is created. Then, in the related art, from the difference image, the protruding areas that are arrangement points at the upper and lower ends in a direction orthogonal to the object alignment direction are extracted, and further, the difference image is separated into a plurality of separated areas corresponding to the areas of the respective pieces of objects. Thereby, an object boundary in the object alignment direction is computed.

CITATION LIST

Patent Literature

Patent Literature 1: JP 2012-12131 A
Patent Literature 2: JP 2012-242289 A

SUMMARY OF INVENTION

Technical Problems

However, since the protruding area extraction and separation process performed in the related art, with respect to the binarized image of the object area, is performed on two-dimensional data, the computation amount is large. Therefore, it is difficult to compute an object boundary in the object alignment direction with a small computation amount from an image in which an imaging area where the objects are aligned is captured.

An object of the present invention is to provide an object discrimination device that solves the above-described problem.

Solution to Problem

An object discrimination device, according to one aspect of the present invention, is configured to include

- an acquisition unit that acquires an image obtained by capturing an imaging area in which a plurality of objects are aligned in an array from a direction orthogonal to an alignment direction of the objects,
- a binarization unit that generates, from the image, a binarized image of an object area that is an area in which the object is present,
- a feature extraction unit that computes a total pixel value for each of arrays of pixel values aligned in a direction orthogonal to the alignment direction of the objects in the binarized image, and generates a total pixel value array in which the total pixel values for respective arrays are aligned in the alignment direction of the objects, and
- an area computation unit that, on a basis of the total pixel value array, computes an object boundary in the alignment direction of the objects in the binarized image.

Further, an object discrimination method, according to another aspect of the present invention, is configured to include

- acquiring an image obtained by capturing an imaging area in which a plurality of objects are aligned in an array from a direction orthogonal to an alignment direction of the objects,
- generating, from the image, a binarized image of an object area that is an area in which the object is present,
- computing a total pixel value for each of arrays of pixel values aligned in a direction orthogonal to the alignment direction of the objects in the binarized image, and generating a total pixel value array in which the total pixel values for respective arrays are aligned in the alignment direction of the objects, and
- on a basis of the total pixel value array, computing an object boundary in the alignment direction of the objects in the binarized image.

A computer-readable medium, according to another aspect of the present invention, is configured to store thereon a program for causing a computer to execute processing to

- acquire an image obtained by capturing an imaging area in which a plurality of objects are aligned in an array from a direction orthogonal to an alignment direction of the objects,
- generate, from the image, a binarized image of an object area that is an area in which the object is present,
- compute a total pixel value for each of arrays of pixel values aligned in a direction orthogonal to the alignment direction of the objects in the binarized image, and generate a total pixel value array in which the total pixel values for respective arrays are aligned in the alignment direction of the objects, and on a basis of the total pixel value array, compute an object boundary in the alignment direction of the objects in the binarized image.

Advantageous Effects of Invention

With the configurations as described above, the present invention is capable of computing object boundaries in the object alignment direction with a small computation amount from an image in which an imaging area where a plurality of objects are aligned is captured.

DESCRIPTION OF EMBODIMENTS

First Example Embodiment

Next, a first example embodiment of the present invention will be described in detail with reference to the drawings. The present embodiment focuses on tablets that are pharmaceutical products as objects, and describes the case of applying the present invention to an object discrimination device for performing appearance inspection on respective tablets on the basis of an image of a plurality of tables captured with a camera. The types and shapes of tablets are arbitrary. Shapes of tablets may be circle, capsulated, disk-shape, ellipse, heart-shape, triangle, or the like. A plurality of tablets having different shapes may be mixed.

Figure 1:
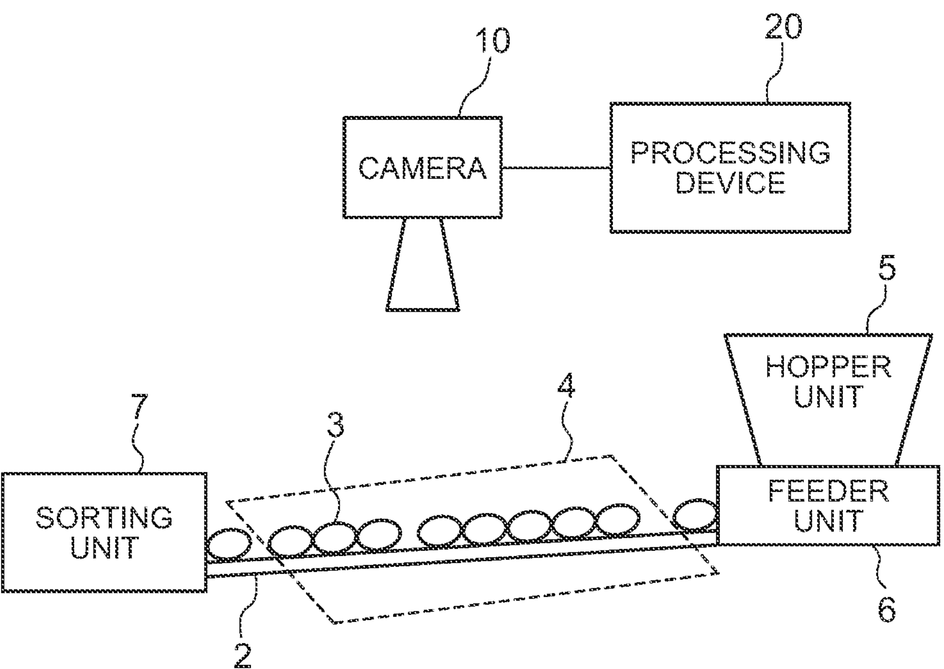
FIG. 1 is a schematic configuration diagram of an object discrimination device according to a first example embodiment of the present invention.

FIG. 1 is a schematic configuration diagram of an object discrimination device 1 according to the present embodiment. Referring to FIG. 1, the object discrimination device 1 includes a camera device 10 and a processing device 20.

The camera device 10 is configured to image a predetermined imaging area 4 set at a location where a plurality of tablets 3 flow in an array on a conveyance path 2. The upstream side of the conveyance path 2 is provided with a hopper unit 5 that supplies a large number of tables, and a feeder unit 6 that conveys a tablet group from the hopper unit 5 to the conveyance path 2. The downstream side of the conveyance path 2 is provided with a sorting unit 7 that sorts the tablet group flowing on the conveyance path 2 into a tablet group that passes the inspection and a tablet group that fails the inspection. The conveyance path 2 is configured to allow the tablet group, conveyed from the feeder unit 6, to be aligned in an array and convey them to the sorting unit 7 at a predetermined constant speed. The conveyance path 2 may have a mechanism to intentionally change the posture of the tablets 3 being conveyed. By changing the posture of the tablets 3 during conveyance in the imaging area 4, it is possible to perform appearance inspection on the whole circumference of each tablet 3.

The imaging direction of the camera device 10 may be set to a direction orthogonal to the alignment direction of the tablets 3 on the conveyance path 2. For example, the camera device 10 may image the tablets flowing in an array on the conveyance path 2 from immediately above. Regarding the orientation of an image captured with the camera device 10, for example, the orientation of the aligned images of the tablets 3 on the captured image may conform to the X-axis direction of the image. Hereinafter, a coordinate system in which a lower left apex of an image captured with the camera device 10 is the origin O, an alignment direction of images of the tablets 3 in the captured image is an X axis, and a direction orthogonal thereto is a Y axis, is assumed. The camera device 10 may be a high-speed color camera equipped with a charge-coupled device (CCD) image sensor or a complementary MOS (CMOS) image sensor having a pixel capacity of about several millions pixels. The camera device 10 is connected with the processing device 20 in a wired or wireless manner. The camera device 10 is configured to transmit, to the processing device 20, time-series captured images together with information indicating the imaging time and the like.

The processing device 20 is an information processing device that performs image processing on an image of an imaging area 4 captured with the camera device 10 and performs a labeling process and inspection of the respective tablets 3. The processing device 20 is connected with the camera device 10 and the sorting unit 7 in a wired or wireless manner.

Figure 2:
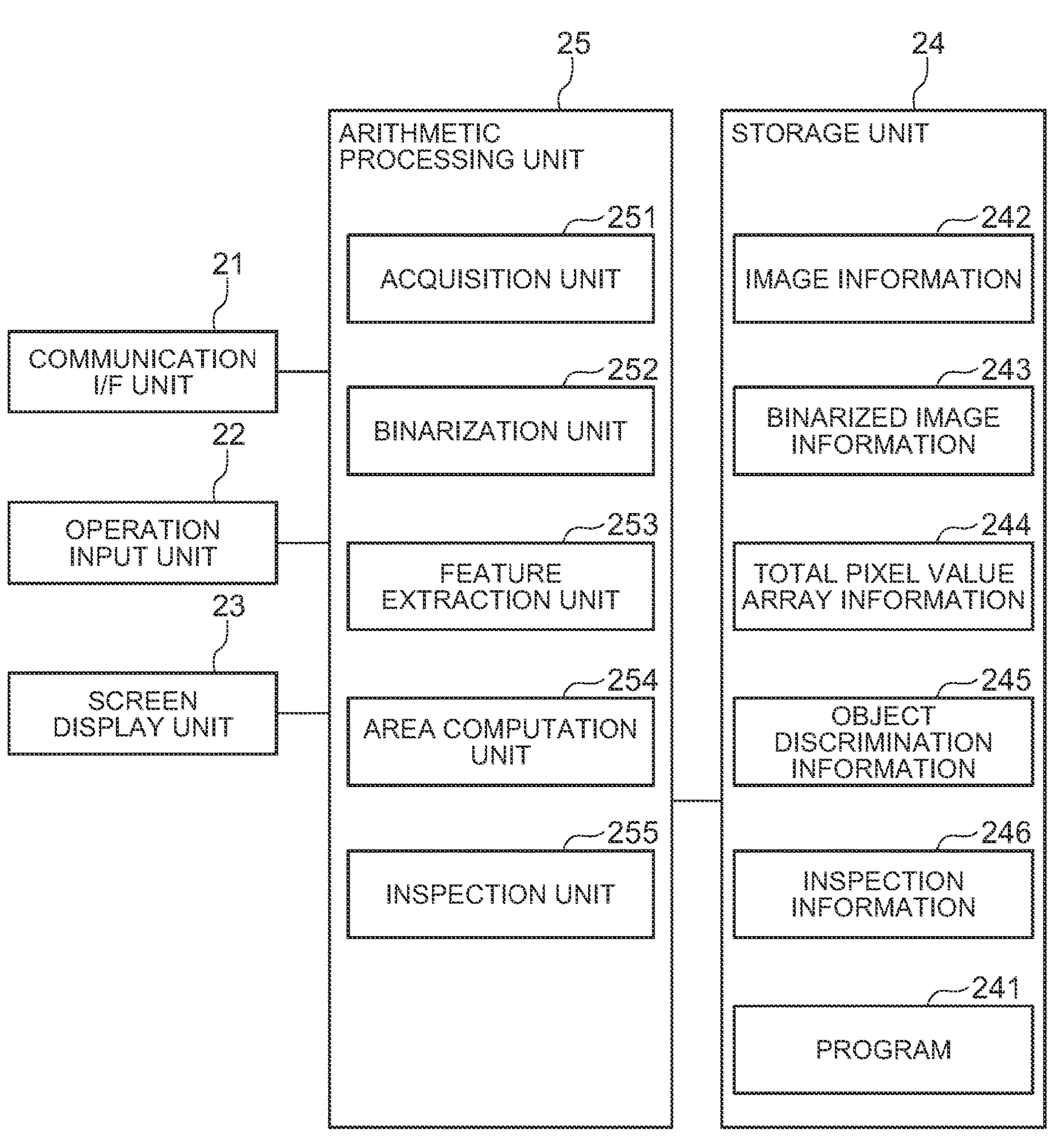
FIG. 2 is a block diagram illustrating an example of a processing device in the object discrimination device according to the first example embodiment of the present invention.

FIG. 2 is a block diagram illustrating an example of the processing device 20. Referring to FIG. 2, the processing device 20 includes, for example, a communication I/F unit 21, an operation input unit 22, a screen display unit 23, a storage unit 24, and an arithmetic processing unit 25.

The communication I/F unit 21 is configured of a data communication circuit, and is configured to perform data communication with the camera device 10, the sorting unit 7, and other external devices, not illustrated, in a wired or wireless manner. The operation input unit 22 is configured of operation input devices such as a keyboard and a mouse, and is configured to detect operation by an operator and output it to the arithmetic processing unit 25. The screen display unit 23 is configured of a screen display device such as a liquid crystal display (LCD) or a plasma display panel (PDP), and is configured to display, on a screen, various types of information such as an inspection result according to an instruction from the arithmetic processing unit 25.

The storage unit 24 is configured of one or more storage devices of one or a plurality of types such as a hard disk and a memory, and is configured to store therein processing information and a program 241 necessary for various types of processing performed by the arithmetic processing unit 25. The program 241 is a program for implementing various processing units by being read and executed by the arithmetic processing unit 25, and is read in advance from an external device or a storage medium, not illustrated, via the data input-output function of the communication I/F unit 21 or the like and is stored in the storage unit 24. The main processing information to be stored in the storage unit 24 includes image information 242, binarized image information 243, total pixel value array information 244, object discrimination information 245, and inspection information 246.

Figure 3:
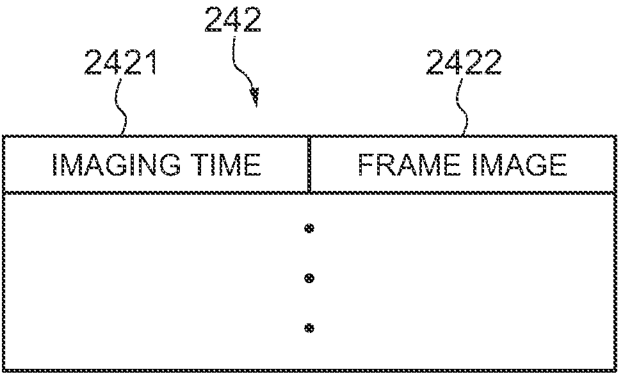
FIG. 3 illustrates an example of a format of image information in the object discrimination device according to the first example embodiment of the present invention.

The image information 242 includes time-series images obtained by capturing the imaging area 4 with the camera device 10. When the tablets 3 flow while being aligned on the conveyance path 2, the image information 242 has images of the tablets 3 aligned in the X-axis direction. FIG. 3 illustrates an example of a format of the image information 242. The image information 242 of this example is configured of an entry consisting of a set of imaging time 2421 and a frame image 2422. In the entries of the imaging time 2421 and the frame image 2422, the imaging time and a frame image are set, respectively. The imaging time 2421 is set to have accuracy (for example, in millisecond units) with which a frame image can be identified while being distinguished from other frame images.

Figure 4:
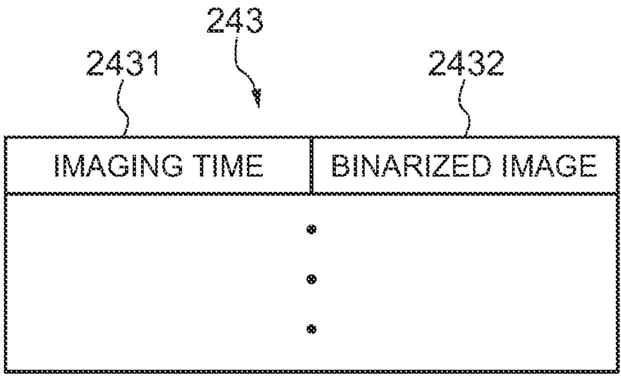
FIG. 4 illustrates an example of a format of binarized image information in the object discrimination device according to the first example embodiment of the present invention.

The binarized image information 243 is an image obtained by detecting and binarizing an image of the tablet 3 shown on the frame image 2422 in the image information 242. In the present embodiment, for example, a pixel value of an image area of the tablet 3 is associated with 255, a pixel value of the remaining area is associated with 0, respectively. FIG. 4 illustrates an example of a format of the binarized image information 243. The binarized image information 243 of this example is configured of an entry consisting of a set of imaging time 2431 and a binarized image 2432. In the respective entries of the imaging time 2431 and the binarized image 2432, an image obtained by binarizing the image of the tablet 3 shown on the imaging time 2421 and the frame image 2422 of the image information 242 is set.

Figure 5:
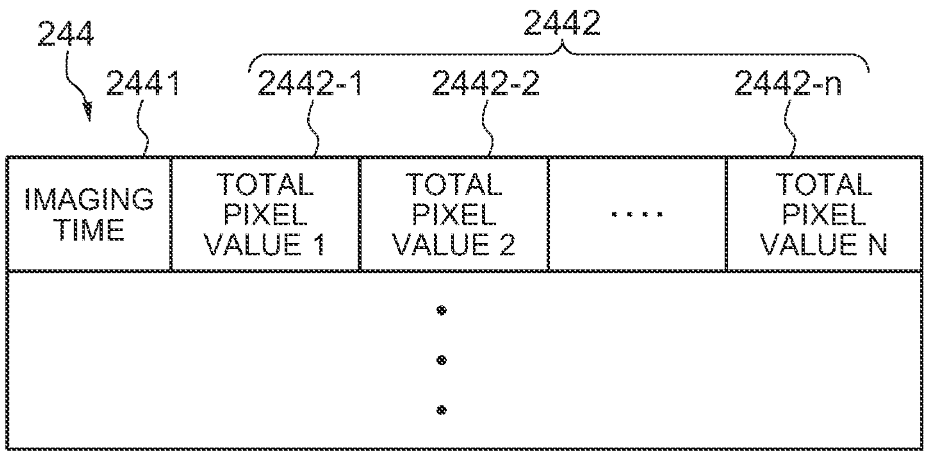
FIG. 5 illustrates an example of a format of total pixel value array information in the object discrimination device according to the first example embodiment of the present invention.

The total pixel value array information 244 is information obtained by computing the total pixel value for each array of pixel values aligned in a direction (Y-axis direction) orthogonal to the alignment direction of the tablets 3 in the binarized image 2432 in the binarized image information 243, and aligning the total pixel values for the respective arrays in the alignment direction (X-axis direction) of the tablets 3. FIG. 5 illustrates an example of a format of the total pixel value array information 244. The total pixel value array information 244 of this example is configured of an entry including a set of imaging time 2441 and a total pixel value array 2442. In the entry of the imaging time 2441, the imaging time 2431 of the binarized image information 243 is set. In the entry of the total pixel value array 2442, total pixel values 2442-1, 2442-2, . . . , **2442-*n* for the respective arrays of pixel values aligned in the direction (Y-axis direction) orthogonal to the alignment direction of the tablets 3 in the binarized image 2432 in the binarized image information 243**, are set.

Figure 6:
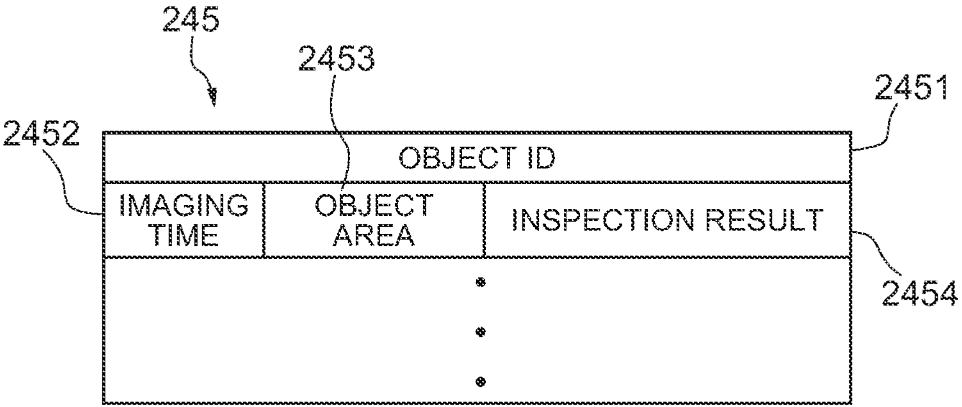
FIG. 6 illustrates an example of a format of object discrimination information in the object discrimination device according to the first example embodiment of the present invention.

The object discrimination information 245 is information related to tablets detected from a binarized image. FIG. 6 illustrates an example of a format of the object discrimination information 245. The object discrimination information 245 of this example is configured of an object ID 2451, and a set of imaging time 2452, an object area 2453, and an inspection result 2454. In the entry of the imaging time 2452, the imaging time 2431 of the binarized image information 243 is set. In the entry of the object area 2453, information specifying the area of an image of the tablet 3 detected from the binarized image 2432 at the imaging time 2431 is set. For example, as the object area 2453, a rectangular area specified by an object boundary (X-coordinate value) in the alignment direction of tablets in the binarized image 2432 and an object boundary (Y-coordinate value) in the direction (Y-axis direction) orthogonal to the alignment direction is set. In the entry of the inspection result 2454, a result of appearance inspection based on the image of the tablet 3 included in the object area 2453 is set. As inspection items, any items may be set. For example, inspection items may be at least one of shape inspection for inspecting a missing portion in a tablet or the like, stain inspection for inspecting adhesion of foreign materials or the like, print inspection for inspecting misprint or the like, stamping inspection for inspecting no stamping or the like, a color inspection for inspecting discoloration or the like. When the same tablet is detected from a plurality of binarized images 2432 whose imaging time is continuous, the same object ID 2451 is assigned to the same tablet. In that case, a set of the imaging time 2552, the object area 2453, and the inspection result 2454 is prepared in the same number as the number of the binarized images 2432.

Figure 7:
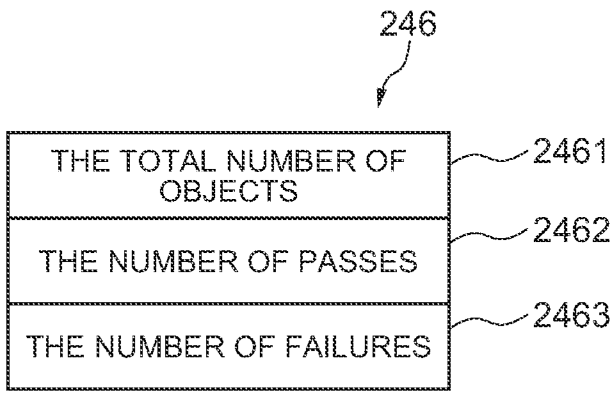
FIG. 7 illustrates an example of a format of inspection information in the object discrimination device according to the first example embodiment of the present invention.

The inspection information 246 is information representing the total number of tablets detected from a binarized image. FIG. 7 illustrates an example of a format of the inspection information 246. The inspection information 246 of this example is configured to include the total number of objects 2461, the number of passes 2462, and the number of failures 2463. In the entry of the total number of objects 2461, the total number of detected tablets is set. In the entry of the number of successes 2462, the total number of tablets having passed the inspection, out of the total number is objects, is set. In the field of the number of failures 2463, the total number of tablets having failed the inspection, out of the total number of objects, is set.

Referring to FIG. 2 again, the arithmetic processing unit 25 includes at least one microprocessor such as an MPU and peripheral circuits thereof, and is configured to read and execute the program 241 from the storage unit 24 to allow the hardware and the program 241 to cooperate with each other to thereby implement the various processing units. The main processing units implemented by the arithmetic processing unit 25 include an acquisition unit 251, a binarization unit 252, a feature extraction unit 253, an area computation unit 254, and an inspection unit 255.

The acquisition unit 251 is configured to control the camera device 10 to acquire the image information 242 obtained by imaging the imaging area 4 where the tablets 3 flow, while being aligned in an array, on the conveyance path 2 at predetermined time intervals, and store it in the storage unit 24.

The binarization unit 252 is configured to read the image information 242 from the storage unit 24, and create the binarized image 2432 of tablets from the frame image 2422 included in the image information 242. The binarization unit 252 is also configured to create the binarized image information 243 including the created binarized image 2432, and store it in the storage unit 24.

The feature extraction unit 253 is configured to read the binarized image information 243 from the storage unit 24, and create the total pixel value array 2442 from the binarized image 2432 included in the binarized image information 243. The feature extraction unit 253 is also configured to create the total pixel value array information 244 including the created total pixel value array 2442, and store it in the storage unit 24.

The area computation unit 254 is configured to read the total pixel value array information 244 from the storage unit 24 and, based on the total pixel value array 2442 included in the total pixel value array information 244, compute the object area 2453 representing the area of each tablet in the binarized image 2432. The area computation unit 254 is also configured to track the object area in the time-series images, and according to the tracking result, assign the same object ID to the same tablet. The area computation unit 254 is also configured to create the object discrimination information 245 for each of the assigned object ID, and store it in the storage unit 24. The area computation unit 254 is also configured to transmit, to the inspection unit 255, the imaging time of the binarized image 2432, the object area 2453 computed from the binarized image, and the object ID 2451 assigned to the object area 2453.

The inspection unit 255 is configured to perform, for each object ID 2451 transmitted from the area computation unit 254, appearance inspection on the basis of a tablet image to which the object ID is assigned. The inspection unit 255 is also configured to record the inspection result on the entry for the inspection result 2454 of the object discrimination information 245 corresponding to the object ID 2451. The inspection unit 255 is also configured to notify the sorting unit 7 of information (for example, current locations of the tablets, and the like) for sorting by discriminating the tablets having failed the inspection from the tablets having passed the inspection. On the basis of the notified information, the sorting unit 7 sorts the tablet group flowing on the conveyance path 2 into a tablet group having passed the inspection and a tablet group having failed the inspection. The inspection unit 255 is also configured to create inspection information 246 by tabulating the inspection results, and store it in the storage unit 24. The inspection unit 255 is also configured to display the object discrimination information 245 and the inspection information 246 on the screen display unit 23, and/or transmit it to an external device via the communication I/F unit 21.

Next, operation of the object discrimination device 1 according to the present embodiment will be described.

Figure 8:
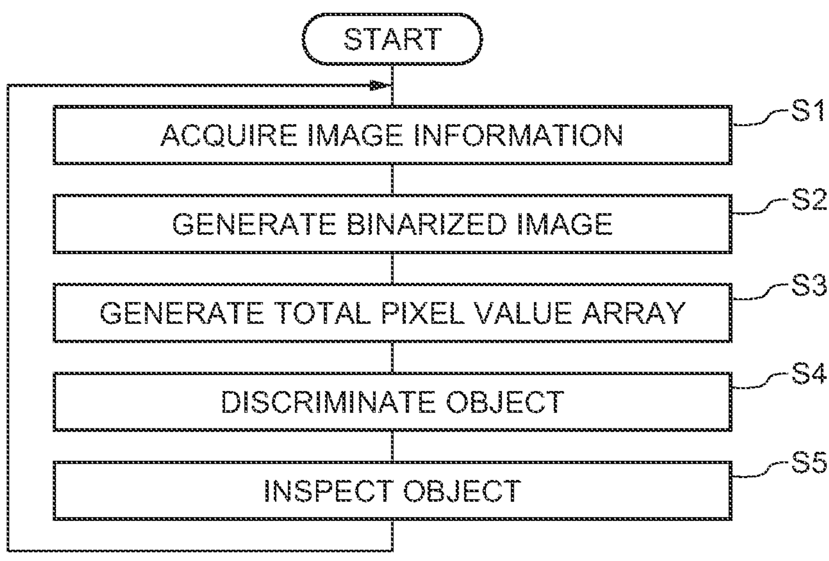
FIG. 8 is a flowchart illustrating an example of an outline of operation performed by the object discrimination device according to the first example embodiment of the present invention.

FIG. 8 is a flowchart illustrating an example of an outline of operation performed by the object discrimination device 1. Referring to FIG. 8, first, the acquisition unit 251 controls the camera device 10 to image, at predetermined time intervals, the imaging area 4 where the tablets 3 flow while being an aligned in an array on the conveyance path 2, and stores the acquired image information 242 in the storage unit 24 (step S1). Then, the binarization unit 252 reads the image information 242 from the storage unit 24, creates the binarized image 2432 of tablets from the frame image 2422 included in the image information 242, and stores the binarized image information 243 including the created binarized image 2432 in the storage unit 24 (step S2) Then, the feature extraction unit 253 reads the binarized image information 243 from the storage unit 24, creates the total pixel value array 2442 from the binarized image 2432 included in the binarized image information 243, and stores the total pixel value array information 244 including the created total pixel value array 2442 in the storage unit 24 (step S3). Then, the area computation unit 254 reads the total pixel value array information 244 from the storage unit 24, and based on the total pixel value array 2442 included in the total pixel value array information 244, computes the object area 2453 representing the area of each tablet in the binarized image 2432 (step S4). Moreover, at step S4, the area computation unit 254 tracks the object area in the time-series images, and according to the tacking result, assigns the same object ID to the same tablet, and for each assigned object ID, creates the object discrimination information 245 and stores it in the storage unit 24. Further, at step S4, the area computation unit 254 transmits, to the inspection unit 255, the object area 2453 computed from the binarized image 2432, and the object ID 2451 assigned to the object area 2453. Then, the inspection unit 255 performs, for each object ID 2451 transmitted from the area computation unit 254, appearance inspection on the basis of the tablet image to which the object ID is assigned (step S5). Moreover, at step S5, the inspection unit 255 notifies the sorting unit 7 of information for sorting the tablets. Further, at step S5, the inspection unit 255 records, in the object discrimination information 245, the inspection result in association with the object ID and the binarized image on the basis of the inspection result. Then, the object discrimination device 1 returns to the processing of step S1. Finally, the inspection unit 255 tabulates the inspection results and creates the inspection result 246 and stores it in the storage unit 24, and displays the object discrimination information 245 and the inspection information 246 on the screen display unit 23 and/or transmits it to an external device via the communication I/F unit 21.

Next, the details of the binarization unit 252 will be described.

Figure 9:
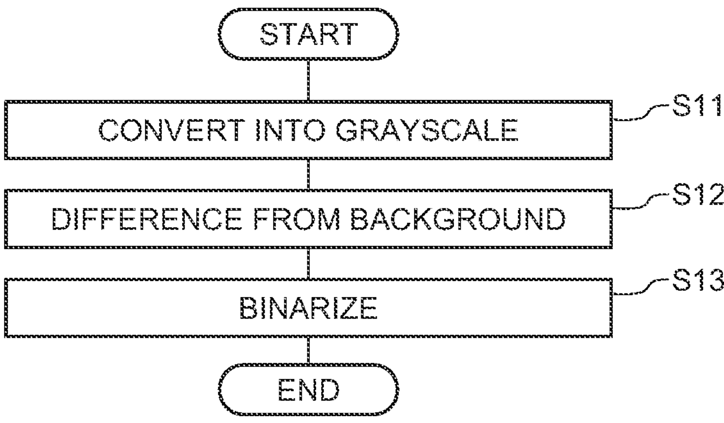
FIG. 9 is a flowchart illustrating an example of processing performed by a binarization unit in the object discrimination device according to the first example embodiment of the present invention.

FIG. 9 is a flowchart illustrating an example of a detailed operation of the binarization unit 252. Referring to FIG. 9, the binarization unit 252 first converts the frame image 2422 into a grayscale image (step S11). Thereby, when the frame image 2422 is an RGB image, a grayscale image in which each pixel has a value from 0 to 255, for example, is obtained. Then, the binarization unit 252 creates a difference image between the grayscale image and a background image having been registered previously (step S12). The background image is a grayscale image in which the imaging area 4 where no tablet 3 is present is captured. As a result, when an image of the tablet 3 is shown on the frame image 2422, a difference image showing only the image of the tablet 3 is obtained. Then, the binarization unit 252 binarizes the difference image (step S13). As a result, for example, the binarized image 2432 in which the pixel value of the image area of the tablet 3 is set to 255 and the pixel value of the rest is set to 0 is obtained.

However, the configuration of the binarization unit 252 is not limited to that described above. For example, when the luminance of the area of the tablet 3 is sufficiently higher than that of the background area, the binarization unit 252 may determine that the area having a higher luminance value than a preset threshold to be the area of the tablet 3 in the grayscale image created at step S11, and binarize the image of only the tablet 3 and extract it.

Next, the details of the feature extraction unit 253 will be described.

Figure 10:
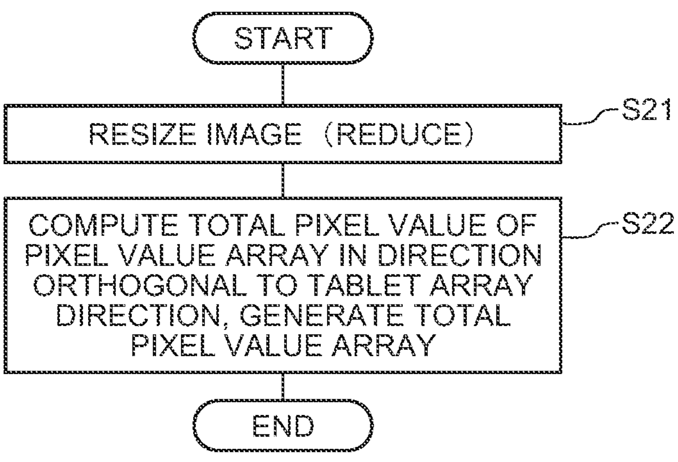
FIG. 10 is a flowchart illustrating an example of processing performed by a feature extraction unit in the object discrimination device according to the first example embodiment of the present invention.

FIG. 10 is a flowchart illustrating an example of a detailed operation of the feature extraction unit 253. Referring to FIG. 10, the feature extraction unit 253 reduces the binarized image 2532 by the predetermined rate (step S21). As a result, a binarized image that is smaller in the longitudinal and horizontal size than that of the original binarized image 2432 is obtained. The reduction rate is determined previously in consideration of speed-up of processing and lowering of accuracy after the reduction. However, image reduction is not mandatory. The original binarized image 2432 may be handled as a reduced binarized image 2432 as it is.

Then, the feature extraction unit 253 computes the total pixel value for each array of pixel values aligned in a direction (Y-axis direction) orthogonal to the alignment direction of the tablets 3 in the reduced binarized image 2432 (hereinafter simply referred to as binarized image 2432), and generates the total pixel value array 2442 in which the total pixel values for the respective arrays are aligned in the alignment direction (X-axis direction) of the tablets 3 (step 22). Generating the total pixel value array 2442 from the total pixel value of each array is also referred to as vectorization.

Figure 11:
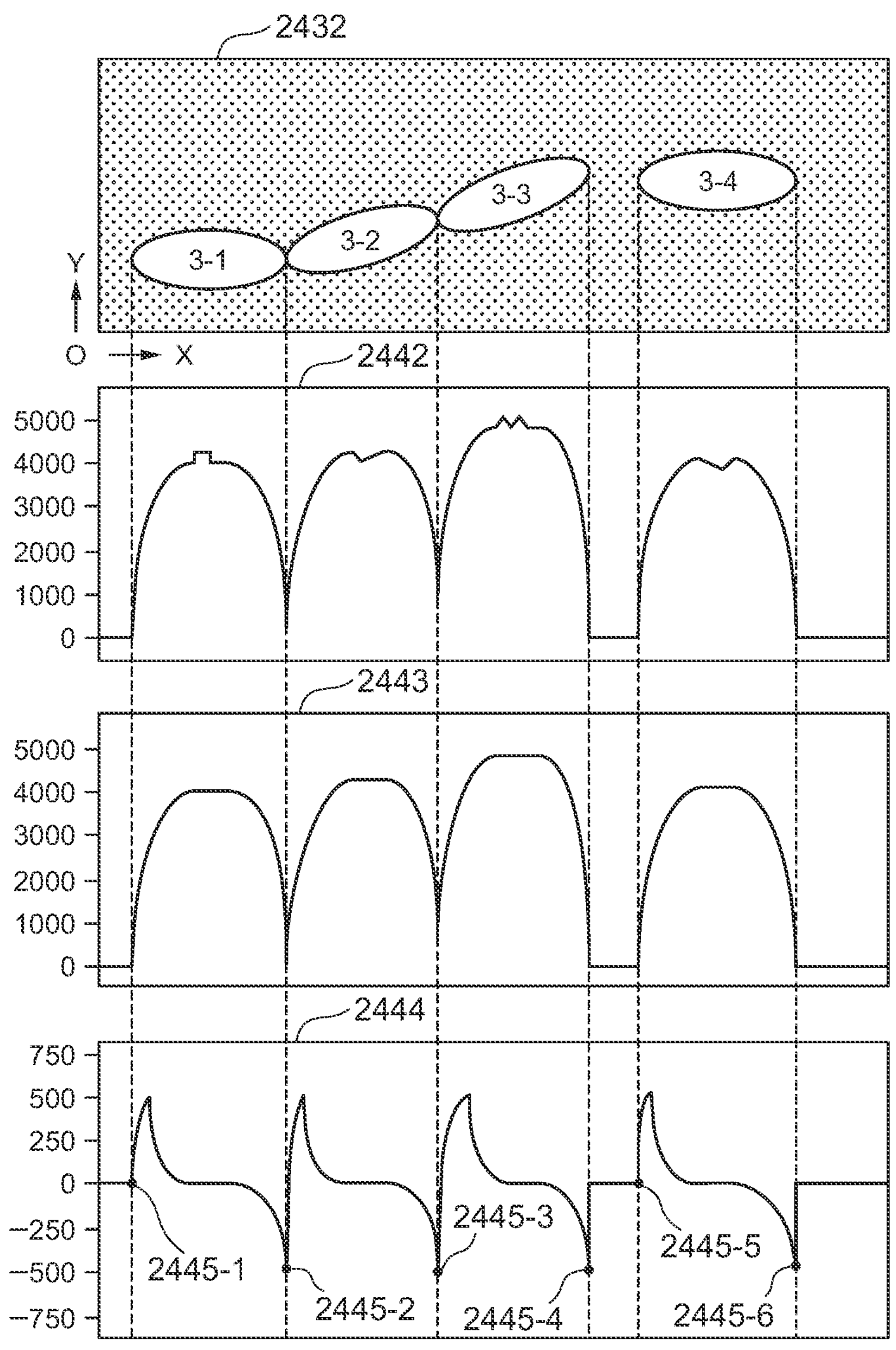
FIG. 11 is a schematic diagram illustrating examples of a binarized image, a total pixel value array, a smoothed total pixel value array, and a differential curve in the object discrimination device according to the first example embodiment of the present invention.

For example, an operation of generating the total pixel value array 2442 by the feature extraction unit 253 will be described more specifically by using the binarized image 2432 as illustrated in FIG. 11 as an example. The binarized image 2432 illustrated in FIG. 11 shows four tablet images 3-1 to 3-4 aligned in the X-axis direction. Among them, the tablet image 3-1 and the tablet image 3-2 are in contact with each other. The tablet image 3-2 is in contact with another tablet image 3-3 on the side opposite to the side in contact with the tablet image 3-1. Further, there is a space between the tablet image 3-3 and the tablet image 3-4. The feature extraction unit 253 uses the XY coordinate system set on the binarized image 2432 to express the position (x, y) of a pixel on the image. Here, the origin of the XY coordinate system is set to a lower left end point. For example, assuming that the number of pixels of the binarized image 2432 is laterally 700 pixels (X-axis direction) by vertically 500 pixel (Y-axis direction), the total number of arrays of pixel values aligned in the Y-axis direction is 700 pieces. For each of the 700 pieces of arrays, the feature extraction unit 253 computes the sum of the pixel values of the 500 pieces of pixels constituting each array. In the case of an array in which no tablet image crosses, all of the 500 pieces of pixels constituting the array have a pixel value 0, so that the total pixel value is 0. On the other hand, in the case of an array in which any tablet image crosses, all of the pixels in the crossing part has a pixel value 255, so that the total pixel value is 255 by n. Here, n represents the number of pixels in the crossing part. The tablet images 3-1 to 3-1 have a rounded shape. As a result, the total number of pixels of an array crossing near the center of a tablet is larger than the total number of pixels of an arran crossing near the edge of a tablet.

In FIG. 11, a reference numeral 2442 denotes a graph of a total pixel value array generated from the binarized image 2432 illustrated in FIG. 11 by the feature extraction unit 253. In the total pixel value array 2442, the vertical axis shows the total pixel value, and the horizontal axis shows the X axis (alignment direction of the tablets 3). The total pixel value array 2442 has four peaks corresponding to the four tablet images in the binarized image 2432 one to one. Between the peaks, there is a valley. The valley is also referred to as a narrow part.

Next, the details of the area computation unit 254 will be described.

Figure 12:
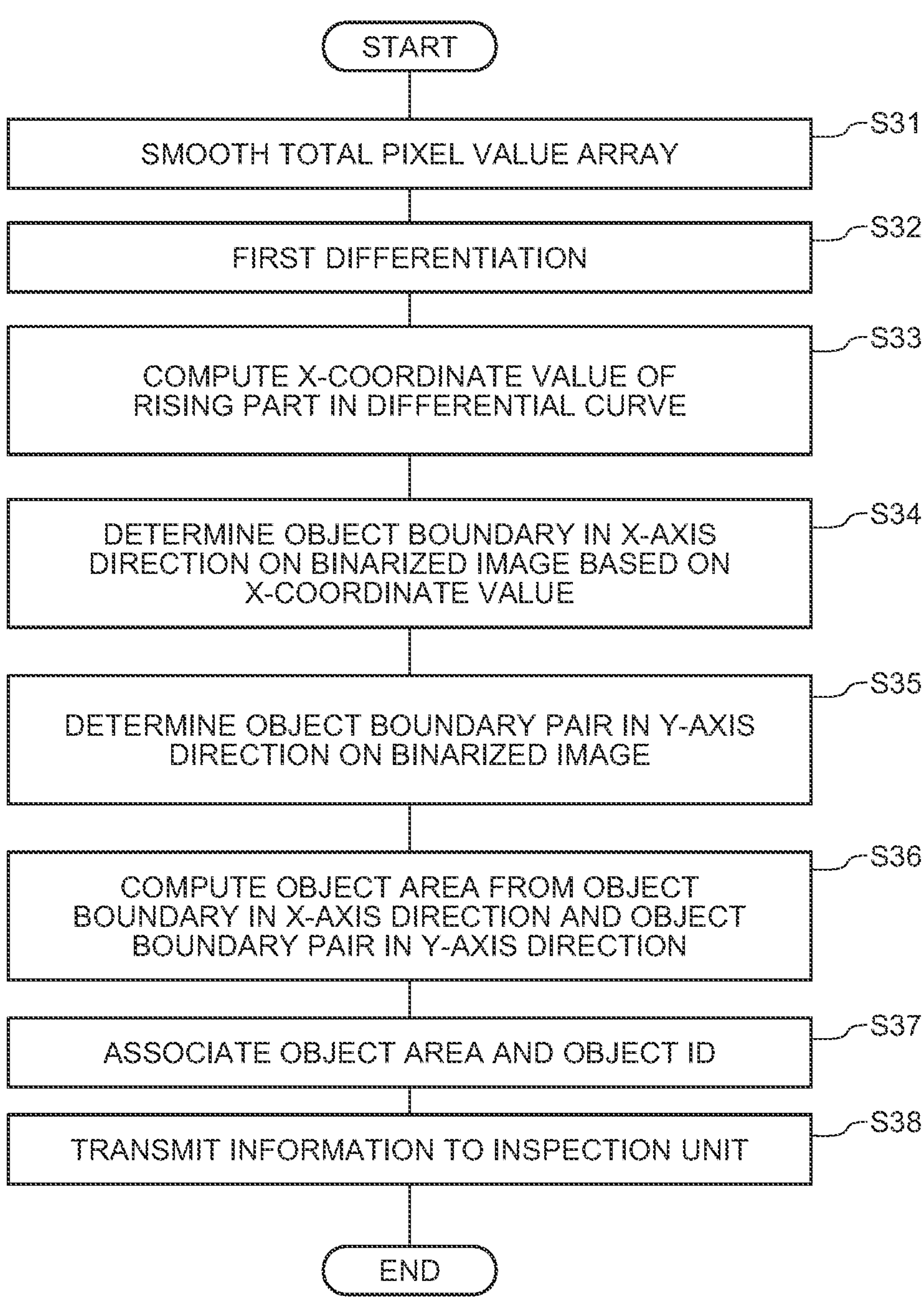
FIG. 12 is a flowchart illustrating an example of processing performed by an area computation unit in the object discrimination device according to the first example embodiment of the present invention.

FIG. 12 is a flowchart illustrating an example of a detailed operation of the area computation unit 254. Referring to FIG. 12, the area computation unit 254 first performs smoothing of the total pixel value array 2442 (step S31). Smoothing of the total pixel value array 2442 is an operation of smoothing the variations (irregularities) in the total pixel values in the total pixel value array 2442 to reduce the noise. The method of smoothing is not limited. For example, moving average processing may be used. Smoothing may be repeated as long as information of the maximum value and the minimum value of the total pixel value array is not lost. For example, with respect to the result of smoothing the total pixel value array 2442, smoothing may be performed again.

The small irregularities drawn in some parts in the total pixel value array 2442 illustrated in FIG. 11 schematically represent variations in the total pixel value caused by the noise. By performing smoothing, the area computation unit 254 reduces the influence of such noise. In FIG. 11, a reference numeral 2443 denotes a total pixel value array after performing smoothing on the total pixel value array 2442 by the area computation unit 254. In the total pixel value array 2443, irregularities caused by the noise shown in the total pixel value array 2442 are reduced, but a maximum value and a minimum value of the total pixel value array remain.

Then, the area computation unit 254 computes an object boundary in the alignment direction of the tablets in the binarized image, on the basis of the total pixel value array 2443 after the smoothing. The total pixel value array 2443 shows changes in the total pixel values corresponding to the tablet images present in the binarized image 2432. For example, in the total pixel value array 2443, a part in which the total pixel value rises from zero substantially matches the left end points of the tablet images 3-1 and 3-4. In the total pixel value array 2443, a part in which the total pixel value falls to zero substantially matches the right end points of the tablet images 3-3 and 3-4. Further, in the total pixel value array 2443, a part in which the total pixel value becomes minimum substantially matches the part where the tablet image 3-1 and the tablet image 3-2 are in contact with each other, and the part where the tablet image 3-2 and the tablet image 3-3 are in contact with each other. Therefore, in the total pixel value array 2443, the area computation unit 254 computes at least one of the part where the total pixel value rises from zero, the part where the total pixel value falls to zero, and the part where the total pixel value becomes minimum, as an object boundary in the alignment direction of the tablets.

In order to efficiently compute the part, the area computation unit 254 performs first differentiation on the total pixel value array after the smoothing in the present embodiment (step S32). For example, in the total pixel value array after the smoothing, the area computation unit 254 performs first differentiation by calculating the difference between the total pixel values of two arrays adjacent to each other in the X-axis direction. The data obtained as a result of performing first differentiation on the total pixel value array after the smoothing is called a differential curve. The differential curve represents the magnitude of a change (magnitude of gradient) in the total pixel value in the total pixel value array. In FIG. 11, a reference numeral 2444 denotes a schematic differential curve obtained by performing first differentiation on the total pixel value array 2443. In the differential curve, the vertical axis shows the magnitude of gradient, and the horizontal axis shows the X axis (alignment direction of the tablets 3). Then, the area computation unit 254 computes the X-coordinate value of the rising part of the differential curve (step S33). The rising part of the differential curve means a part where the gradient is changed from zero to positive, or the part where the gradient is changed from negative to zero or positive. For example, in the differential curve 2444 of FIG. 11, parts denoted by 2445-1, 2445-2, 2445-3, 2445-4, 2445-5, and 2445-6 are rising parts. These parts are a part where the total pixel value rises from zero, a part where the total pixel value falls to zero, or a part where the total pixel value becomes minimum, in the total pixel value array 2443.

Then, the area computation unit 254 determines an object boundary in the X-axis direction of tablet images on the binarized image on the basis of the X-coordinate value of the rising part of the differential curve (step S35). This uses the fact that the rising part of the differential curve conforms to an end portion in the X-axis direction of the tablet image as described above. For example, as illustrated by broken lines in FIG. 11, the rising part 2445-1 conforms to the left end of the tablet image 3-1. Further, the rising part 2445-2 conforms to the right end of the tablet image 3-1 and the left end of the tablet image 3-2, for example. Similarly, the rising parts 2445-3 to 2445-6 conform to the ends in the X-axis direction of the tablet images 3-2 to 3-4.

Figure 13:
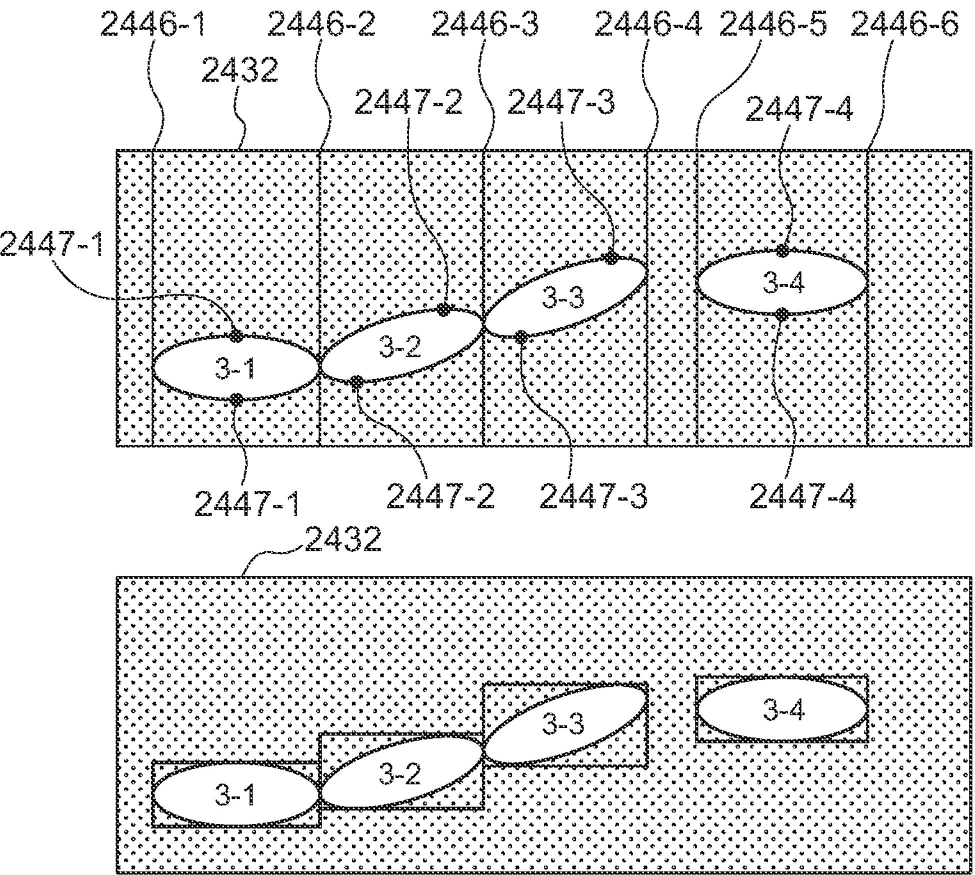
FIG. 13 is a schematic diagram illustrating examples of an object boundary (tablet boundary) in a tablet alignment direction and an object boundary (tablet boundary) in a direction orthogonal to the tablet alignment direction in the object discrimination device according to the first example embodiment of the present invention.

In FIG. 13, the object boundaries 2446-1 to 2446-6 extending in the Y-axis direction described on the binarized image 2432 schematically show the object boundaries in the X-axis direction of tablet images determined based on the X-coordinate values of the rising parts in the differential curve by the area computation unit 254. For example, for each rising part in the differential curve, the area computation unit 254 determines a line crossing the X-coordinate value of the part and parallel to the Y axis to be an object boundary.

Then, the area computation unit 254 determines an object boundary in the Y-axis direction on the binarized image (step S35). Specifically, first, the area computation unit 254 focuses on an object boundary pair in the X-axis direction adjacent to each other. Then, the area computation unit 254 determines whether or not there is a tablet image in a partial area on the binarized image sandwiched between the focused object boundary pair. If there is no tablet image, the area computation unit 254 ends the processing on the focused object boundary pair. If there is a tablet image, the area computation unit 254 determines the pixel at the upper end of the tablet image (pixel of an image whose Y-coordinate value is the largest) to be one boundary constituting the object boundary pair in the Y-axis direction. Further, the area computation unit 254 determines the pixel at the lower end of the tablet image (pixel of an image whose Y-coordinate value is the smallest) to be the other boundary constituting the object boundary pair in the Y-axis direction. Then, the area computation unit 254 ends the processing on the focused object boundary pair. Upon completion of the processing on the focused object boundary pair, the area computation unit 254 determines whether or not there remains any other object boundary pair in the X-axis direction adjacent to each other not having been focused. If any, the area computation unit 254 moves focus on the remaining object boundary pair and repeats the same processing as that described above. If not, the area computation unit 254 ends the processing at step S35.

Black circles denoted by reference numerals 2447-1 to 2447-4 in the binarized image 2432 illustrated in FIG. 13 represent object boundary pairs in the Y-axis direction determined by the area computation unit 254.

Next, the area computation unit 254 determines an object area (tablet area) on the basis of the object boundaries in the X-axis direction and an object boundary pair in the Y-axis direction (step S36). Specifically, first, the area computation unit 254 focuses on an object boundary pair in the Y-axis direction. Then, the area computation unit 254 computes XY coordinate values of four points in total at which a line segment passing through one boundary constituting the focused object boundary pair and parallel to the X axis, a line segment passing through the other boundary and parallel to the X axis, and two object boundaries in the Y-axis direction adjacent to both sides of the focused object boundary pair, cross each other. Then, the area computation unit 254 determines a rectangle whose apexes are the above-described four points to be an object area corresponding to the focused object boundary pair. Upon determination of the object area corresponding to the focused object boundary pair, the area computation unit 254 determines whether or not there remains any object boundary pair having not processed, and if any, the area computation unit 254 moves the focus to an unprocessed object boundary pair, and repeats the same processing as that described above. When the area computation unit 254 completes focusing on all object boundary pairs, the area computation unit 254 ends the processing at step S36.

The rectangles 2448-1 to 2448-4 in the binarized image 2432 illustrated in FIG. 13 represent object areas of the respective tablets determined by the area computation unit 254.

Then, the area computation unit 254 associates the object area with the object ID (step S37). Specifically, in the case of the binarized image 2432 acquired first, the area computation unit 254 adopts and assigns different object IDs to the respective object areas computed from the binarized image 2432. Then, the area computation unit 254 newly creates the object discrimination information 245 having the assigned object ID 2451, and a set of the imaging time 2452, the object area 2453, and the inspection result 2454 having NULL value, and store it in the storage unit 24. Meanwhile, in the case of the binarized image 2432 acquired at the second time or later, the area computation unit 254 determines whether or not the object area computed from the currently acquired binarized image 2432 is of the same tablet as the object area computed from the binarized image 2432 having the last imaging time that is acquired immediately before. This determination is performed by, for example, comparing the distance between, for example, the center of gravity of the object area computed from the currently acquired binarized image 2432 and the center of gravity of the object area computed from the binarized image 2432 acquired immediately before, with a predetermined threshold, and when the distance is equal to or smaller than the threshold, determining that they are the same tablet. Then, among the object areas computed from the currently acquired binarized image 2432, for those of the same tablet as the object area computed from the binarized image 2432 acquired last time, the area computation unit 254 adds the set of the imaging time 2453 and the object area 2453 and the inspection result 2454 having NULL value of the current binarized image 2432 to the object discrimination information 245 having the object ID 2451 assigned to the same tablet. Further, for the object areas computed from the currently acquired binarized image 2432 of a new tablet, the area computation unit 254 adopts and assigns a new object ID, creates new object discrimination information 245 having the assigned object ID 2451 and a set of the imaging time 2452 of the binarized image 2432 and the computed object area 2453 and the inspection result 2454 having NULL value, and stores it in the storage unit 24.

Then, the area computation unit 254 transmits, to the inspection unit 255, the imaging time of the current binarized image 2432, the object area 2453 computed therefrom, and the object ID 2451 assigned thereto (step S38).

Next, the details of the inspection unit 255 will be described.

Figure 14:
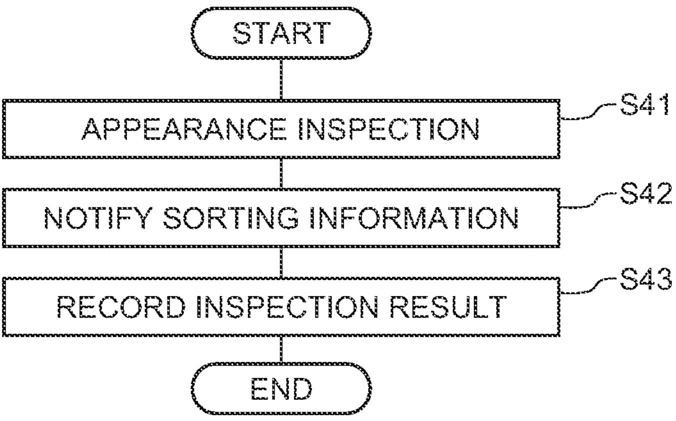
FIG. 14 is a flowchart illustrating an example of processing performed by an inspection unit in the object discrimination device according to the first example embodiment of the present invention.

FIG. 14 is a flowchart illustrating an example of a detailed operation of the inspection unit 255. Referring to FIG. 14, the inspection unit 255 first performs appearance inspection (step S41). Specifically, the inspection unit 255 extracts an image part of the object area 2453 transmitted from the area computation unit 254, from the binarized image 2432 at the imaging time transmitted from the area computation unit 254. Then, the inspection unit 255 analyzes the extracted image part, and performs appearance inspection of the tablet according to the object ID transmitted from the area computation unit 254. In this example, the inspection unit 255 performs appearance inspection of a tablet by using a binarized image, but it is also possible to perform appearance inspection of a tablet by using a frame image that is the source of the binarized image. Then, when the tablet fails the inspection, the inspection unit 255 notifies the sorting unit 7 of information for sorting the tablet (step S42). Then, the inspection unit 255 records the inspection result on the entry for the inspection result 2454 of the object discrimination information 245 corresponding to the object ID (step S43). Then, the inspection unit 255 ends the processing of FIG. 14.

Further, when a predetermined condition is satisfied such as when a request is made from an administrator, a predetermined time arrives, or a predetermined period elapses, the inspection unit 255 creates the inspection information 246 by tabulating the inspection results and store it in the storage unit 24. Further, when the predetermined condition is satisfied, the inspection unit 255 displays the object discrimination information 245 and the inspection information 246 on the screen display unit 23, and/or transmit it to an external device via the communication I/F unit 21.

As described above, according to the present embodiment, it is possible to discriminate an object boundary in the alignment direction of tablets by a small computation amount from an image of the imaging area 4 in which the tablets 3 are aligned. This is because the total pixel value for each array of pixel values aligned in a direction orthogonal to the alignment direction of the tablets 3 in the binarized image 2432 is computed, and based on the total pixel value array in which the total pixel values for the respective arrays are aligned in the alignment direction of the tablets 3, the object boundaries in the alignment direction of the tablets 3 in the binarized image 2432 are discriminated.

Further, according to the present embodiment, even in the case where the aligned tablets 3 are in contact with each other in the alignment direction, it is possible to discriminate object boundaries in the alignment direction by a small computation amount with high accuracy. This is because the part where the total pixel value rises from zero, the part where the total pixel value falls to zero, and the part where the total pixel value becomes minimum, in the total pixel value array, are computed as object boundaries in the alignment direction of the tablets. Moreover, the rising part in the differential curve obtained by performing first differentiation on the total pixel value array is computed as an object boundary in the alignment direction of the tablets.

Next, a modification of the present embodiment will be described.

<Modification 1>

Figure 15:
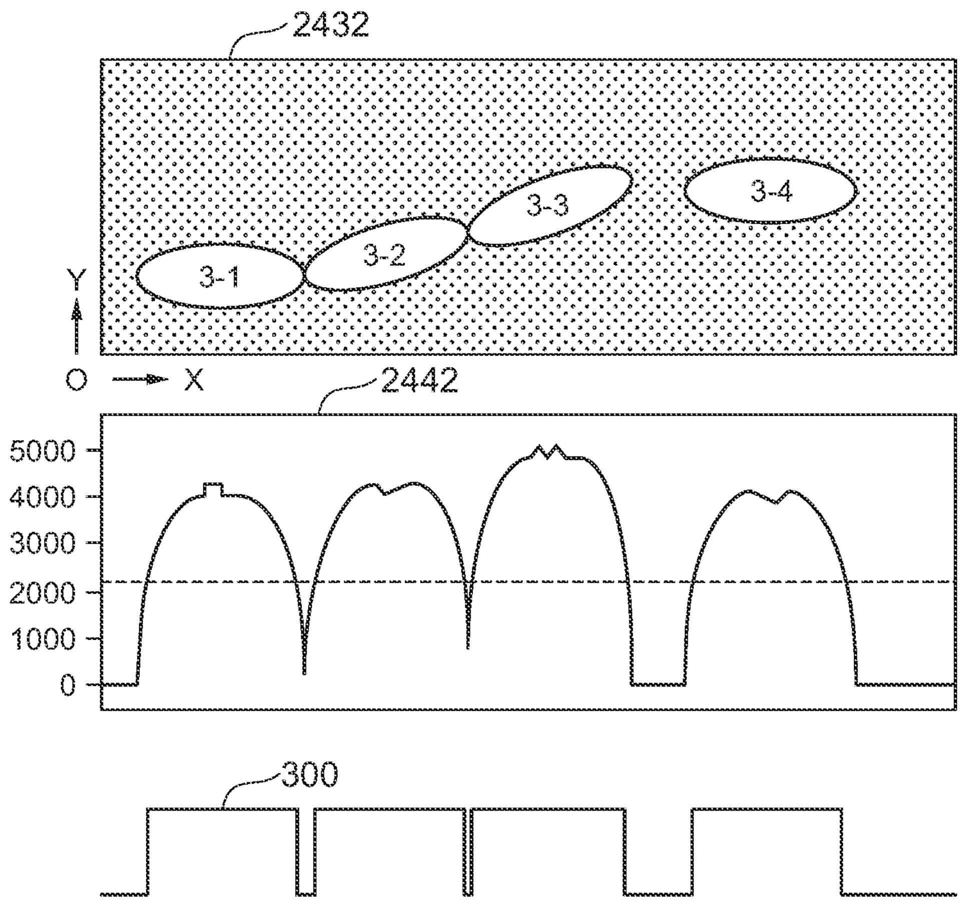
FIG. 15 illustrates an operation in a first modification of the first example embodiment of the present invention.

The area computation unit 254 may compute object boundaries in the alignment direction of the tablets in the binarized image from a result of comparison between each of the total pixel values in the total pixel value array and a predetermined threshold. For example, as illustrated in FIG. 15, the area computation unit 254 compares each of the total pixel values of the total pixel value array 2442 illustrated in FIG. 11 with a threshold TH. Then, as data representing a section in the alignment direction of the tablets that becomes a total pixel value that is equal to or larger than the threshold TH, data denoted by a reference numeral 300 in FIG. 15 is obtained. The area computation unit 254 computes, in the data 300, a rising part from zero or a falling part to zero as an object boundary in the alignment direction of the tablets. According to Modification 1, it is possible to compute an object boundary in the alignment direction of the tablets with a smaller computation amount, although the accuracy of computing an object boundary is degraded compared with the previous embodiment. Therefore, Modification 1 is sufficiently usable for the purpose of counting the number of tablets.

<Modification 2>

Instead of the camera device 10, it is possible to use an X-ray camera such as an X-ray sensor camera. Further, the acquisition unit 251 may acquire an X-ray transmission image obtained by imaging an inspected object in the imaging area 4 where objects are aligned, by an X-ray camera. The binarization unit 252 may binarizes a pixel value that is X-ray concentration data of the acquired X-ray transmission image. Further, the feature extraction unit 253 may computes the total pixel value for each array of pixel values aligned in a direction orthogonal to the alignment direction of the objects in the binarized X-ray transmission image, and generates a total pixel value array in which the total pixel values for the respective arrays are aligned in the alignment direction of the objects. Further, the area computation unit 254 may compute an object boundary in the alignment direction of the objects in the binarized X-ray transmission image, on the basis of the total pixel value array. Further, the inspection unit 255 may perform inspection such as counting of the number of objects, on the basis of the computed object boundary.

Second Example Embodiment

Figure 16:
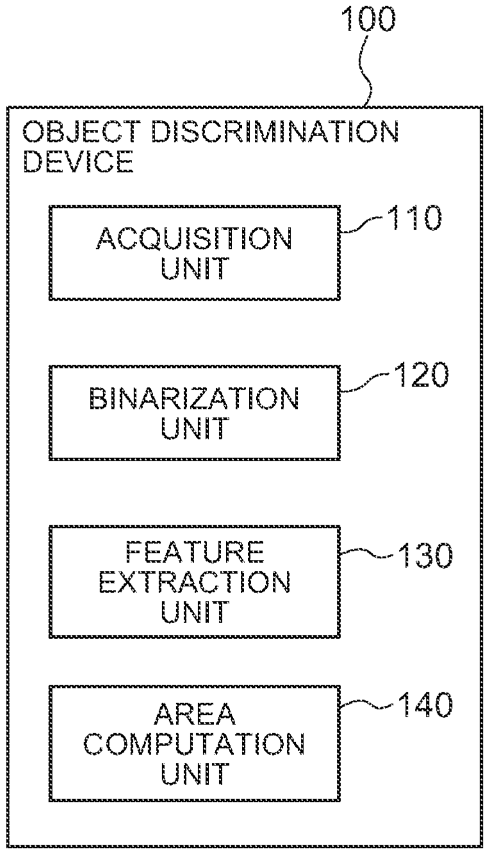
FIG. 16 is a block diagram of an object discrimination device according to a second example embodiment of the present invention.

Next, an object discrimination device 100 according to a second example embodiment of the present invention will be described with reference to FIG. 16. FIG. 16 is a block diagram of the object discrimination device 100 according to the second example embodiment of the present invention.

Referring to FIG. 16, the object discrimination device 100 is configured to include an acquisition unit 110, a binarization unit 120, a feature extraction unit 130, and an area computation unit 140.

The acquisition unit 110 is configured to acquire an image obtained by capturing an imaging area where a plurality of objects are aligned in an array from a direction orthogonal to the alignment direction. Here, objects may be, for example, pharmaceutical products such as tablets, food such as confectionary, industrial products such as screws, and the like. The three-dimensional shape of an object is arbitrary, and may be a rounded shape such as a spherical shape, a cylindrical shape, an elliptic shape, or a disk shape. The acquisition unit 110 may have the same configuration as that of the acquisition unit 251 of FIG. 2, but is not limited thereto.

The binarization unit 120 is configured to generate a binarized image of an object area that is an area where an object exists, from an image acquired by the acquisition unit 110. The binarization unit 120 may have the same configuration as that of the binarization unit 252 in FIG. 2, but is not limited thereto.

The feature extraction unit 130 is configured to compute the total pixel value for each of arrays of objects aligned in a direction orthogonal to the alignment direction of the objects in the binarized image generated by the binarization unit 120, and generate a total pixel value array in which the total pixel values for the respective arrays are aligned in the alignment direction of the objects. The feature extraction unit 130 may have the same configuration as that of the feature extraction unit 253 of FIG. 2 for example, but is not limited thereto.

The area computation unit 140 is configured to compute object boundaries in the alignment direction of the objects in the binarized image generated by the binarization unit 120, on the basis of the total pixel value array generated by the feature extraction unit 130. The area computation unit 140 may have the same configuration as that of the area computation unit 254 of FIG. 2 for example, but is not limited thereto.

The object discrimination device 100 configured as described above operates as described below. The acquisition unit 110 acquires an image obtained by capturing an imaging area where a plurality of objects are aligned in an array from a direction orthogonal to the alignment direction of the objects. Then, the binarization unit 120 generates a binarized image of an object area that is an area where an object exists, from the image acquired by the acquisition unit 110. Then, the feature extraction unit 130 computes the total pixel value for each of arrays of objects aligned in a direction orthogonal to the alignment direction of the objects in the binarized image generated by the binarization unit 120, and generates a total pixel value array in which the total pixel values for the respective arrays are aligned in the alignment direction of the objects. Then, the area computation unit 140 computes an object boundary in the alignment direction of the objects in the binarized image generated by the binarization unit 120, on the basis of the total pixel value array generated by the feature extraction unit 130.

According to the object discrimination device 100 that is configured and operates as described above, it is possible to compute object boundaries in the alignment direction of the objects with a small computation amount from an image obtained by capturing the imaging area where the objects are aligned in an array. This is because the object discrimination device 100 computes the total pixel value for each of arrays of pixel values aligned in a direction orthogonal to the alignment direction of the objects in the binarized image, generates a total pixel value array in which the total pixel values for the respective arrays are aligned in the alignment direction of the object, and based on the total pixel value array, computes object boundaries in the alignment direction of the objects in the binarized image.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to the field of performing counting management, appearance inspection, and the like of objects such as tablets.

The whole or part of the example embodiments disclosed above can be described as, but not limited to, the following supplementary notes.

(Supplementary Note 1)

An object discrimination device comprising:

an acquisition unit that acquires an image obtained by capturing an imaging area in which a plurality of objects are aligned in an array from a direction orthogonal to an alignment direction of the objects;

a binarization unit that generates, from the image, a binarized image of an object area that is an area in which the object is present;

a feature extraction unit that computes a total pixel value for each of arrays of pixel values aligned in a direction orthogonal to the alignment direction of the objects in the binarized image, and generates a total pixel value array in which the total pixel values for respective arrays are aligned in the alignment direction of the objects; and an area computation unit that, on a basis of the total pixel value array, computes an object boundary in the alignment direction of the objects in the binarized image.

(Supplementary Note 2)

The object discrimination device according to supplementary note 1, wherein the area computation unit computes at least one of a part in which the total pixel value rises from zero, a part in which the total pixel value falls to zero, and a part in which the total pixel value becomes minimum, as the object boundary.

(Supplementary Note 3)

The object discrimination device according to supplementary note 1 or 2, wherein the area computation unit computes a rising part in a differential curve obtained by performing first differentiation on the total pixel value array, as the object boundary.

(Supplementary Note 4)

The object discrimination device according to any of supplementary notes 1 to 3, wherein the feature extraction unit further performs smoothing on the total pixel value array before computing the object boundary.

(Supplementary Note 5)

The object discrimination device according to any of supplementary notes 1 to 4, wherein the area computation unit further computes an object boundary in a direction orthogonal to the alignment direction of the objects in the binarized image.

(Supplementary Note 6)

The object discrimination device according to any of supplementary notes 1 to 5, wherein the object is a tablet.

(Supplementary Note 7)

An object discrimination method comprising:

acquiring an image obtained by capturing an imaging area in which a plurality of objects are aligned in an array from a direction orthogonal to an alignment direction of the objects;

generating, from the image, a binarized image of an object area that is an area in which the object is present;

computing a total pixel value for each of arrays of pixel values aligned in a direction orthogonal to the alignment direction of the objects in the binarized image, and generating a total pixel value array in which the total pixel values for respective arrays are aligned in the alignment direction of the objects; and on a basis of the total pixel value array, computing an object boundary in the alignment direction of the objects in the binarized image.

(Supplementary Note 8)

The object discrimination method according to supplementary note 7, wherein the computing the object boundary includes computing at least one of a part in which the total pixel value rises from zero, a part in which the total pixel value falls to zero, and a part in which the total pixel value becomes minimum, as the object boundary.

(Supplementary Note 9)

The object discrimination method according to supplementary note 7 or 8, wherein the computing the object boundary includes computing a rising part in a differential curve obtained by performing first differentiation on the total pixel value array, as the object boundary.

(Supplementary Note 10)

The object discrimination method according to any of supplementary notes 7 to 9, wherein the computing the object boundary includes performing smoothing on the total pixel value array before computing the object boundary.

(Supplementary Note 11)

The object discrimination method according to any of supplementary notes 7 to 10, wherein the computing the object boundary includes further computing an object boundary in a direction orthogonal to the alignment direction of the objects in the binarized image.

(Supplementary Note 12)

The object discrimination method according to any of supplementary notes 7 to 11, wherein the object is a tablet.

(Supplementary Note 13)

A computer-readable medium storing thereon a program for causing a computer to execute processing to:

acquire an image obtained by capturing an imaging area in which a plurality of objects are aligned in an array from a direction orthogonal to an alignment direction of the objects;

generate, from the image, a binarized image of an object area that is an area in which the object is present;

compute a total pixel value for each of arrays of pixel values aligned in a direction orthogonal to the alignment direction of the objects in the binarized image, and generate a total pixel value array in which the total pixel values for respective arrays are aligned in the alignment direction of the objects; and on a basis of the total pixel value array, compute an object boundary in the alignment direction of the objects in the binarized image.

REFERENCE SIGNS LIST

1 object discrimination device
2 conveyance path
3 tablet
4 imaging area
5 hopper unit
6 feeder unit
7 sorting unit
10 camera device
20 processing device

What is claimed is:

1. An object discrimination device comprising:

a memory containing program instructions; and a processor coupled to the memory, wherein the processor is configured to execute the program instructions to:

acquire an image obtained by capturing an imaging area in which a plurality of objects are aligned in an array from a direction orthogonal to an alignment direction of the objects;

generate, from the image, a binarized image of an object area that is an area in which the object is present;

compute a total pixel value for each of arrays of pixel values aligned in a direction orthogonal to the alignment direction of the objects on a same horizontal plane in the binarized image, and generate a total pixel value array in which the total pixel values for respective arrays are aligned in the alignment direction of the objects; and on a basis of the total pixel value array, compute an object boundary in the alignment direction of the objects in the binarized image, wherein the object is a tablet.

2. The object discrimination device according to claim 1, wherein the computing the object boundary includes computing at least one of a part in which the total pixel value rises from zero, a part in which the total pixel value falls to zero, and a part in which the total pixel value becomes minimum, as the object boundary.

3. The object discrimination device according to claim 1, wherein the computing the object boundary includes computing a rising part in a differential curve obtained by performing first differentiation on the total pixel value array, as the object boundary.

4. The object discrimination device according to claim 1, wherein the processor is further configured to execute the instructions to perform smoothing on the total pixel value array before computing the object boundary.

5. The object discrimination device according to claim 1, wherein the processor is further configured to execute the instructions to compute an object boundary in a direction orthogonal to the alignment direction of the objects on the same horizontal plane in the binarized image.

6. The object discrimination device according to claim 1, wherein the processor is further configured to execute the instructions to, for each pair of the object boundaries adjacent to each other in the alignment direction of the objects, determine whether or not an image of the object is present in a partial area on the binarized image sandwiched between the pair of the object boundaries.

7. An object discrimination method comprising:

acquiring an image obtained by capturing an imaging area in which a plurality of objects are aligned in an array from a direction orthogonal to an alignment direction of the objects;

generating, from the image, a binarized image of an object area that is an area in which the object is present;

computing a total pixel value for each of arrays of pixel values aligned in a direction orthogonal to the alignment direction of the objects on a same horizontal plane in the binarized image, and generating a total pixel value array in which the total pixel values for respective arrays are aligned in the alignment direction of the objects; and on a basis of the total pixel value array, computing an object boundary in the alignment direction of the objects in the binarized image, wherein the object is a tablet.

8. The object discrimination method according to claim 7, wherein the computing the object boundary includes computing at least one of a part in which the total pixel value rises from zero, a part in which the total pixel value falls to zero, and a part in which the total pixel value becomes minimum, as the object boundary.

9. The object discrimination method according to claim 7, wherein the computing the object boundary includes computing a rising part in a differential curve obtained by performing first differentiation on the total pixel value array, as the object boundary.

10. The object discrimination method according to claim 7, wherein the computing the object boundary includes performing smoothing on the total pixel value array before computing the object boundary.

11. The object discrimination method according to claim 7, wherein the computing the object boundary includes further computing an object boundary in a direction orthogonal to the alignment direction of the objects on the same horizontal plane in the binarized image.

12. The object discrimination method according to claim 7, further comprising, for each pair of the object boundaries adjacent to each other in the alignment direction of the objects, determining whether or not an image of the object is present in a partial area on the binarized image sandwiched between the pair of the object boundaries.

13. A non-transitory computer-readable medium storing thereon a program comprising instructions for causing a computer to execute processing comprising:

acquiring an image obtained by capturing an imaging area in which a plurality of objects are aligned in an array from a direction orthogonal to an alignment direction of the objects;

generating, from the image, a binarized image of an object area that is an area in which the object is present;

computing a total pixel value for each of arrays of pixel values aligned in a direction orthogonal to the alignment direction of the objects on a same horizontal plane in the binarized image, and generating a total pixel value array in which the total pixel values for respective arrays are aligned in the alignment direction of the objects; and on a basis of the total pixel value array, computing an object boundary in the alignment direction of the objects in the binarized image, wherein the object is a tablet.

14. The non-transitory computer-readable medium according to claim 13, wherein the instructions further cause the computer to execute processing comprising:

for each pair of the object boundaries adjacent to each other in the alignment direction of the objects, determining whether or not an image of the object is present in a partial area on the binarized image sandwiched between the pair of the object boundaries.

* * * * *